(12) United States Patent
Tsuchimoto (10) Patent No.: US 11,308,341 B2
(45) Date of Patent: Apr. 19, 2022

(54) VERIFICATION METHOD, VERIFICATION DEVICE, AND NON-TRANSITORY TANGIBLE STORAGE MEDIUM

(71) Applicant: DENSO CORPORATION, Kariya (JP)

(72) Inventor: Toshiyuki Tsuchimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 49 days.

(21) Appl. No.: 16/865,058

(22) Filed: May 1, 2020

(65) Prior Publication Data
US 2020/0356797 A1    Nov. 12, 2020

(30) Foreign Application Priority Data

May 9, 2019    (JP) .............................. JP2019-089229

(51) Int. Cl.
*G06K 9/40*        (2006.01)
*G06K 9/03*        (2006.01)
(Continued)

(52) U.S. Cl.
CPC ........... *G06K 9/03* (2013.01); *G06K 9/00624* (2013.01); *G06K 9/036* (2013.01); *G06K 9/36* (2013.01);
(Continued)

(58) Field of Classification Search
CPC ........... G06K 9/00221; G06K 9/00228; G06K 9/00362; G06K 9/00624; G06K 9/00664; G06K 9/00771; G06K 9/00785; G06K 9/00791; G06K 9/00798; G06K 9/00805; G06K 9/00818; G06K 9/00825; G06K 9/03; G06K 9/036; G06K 9/36; G06K 9/40; G06K 9/62; G06K 9/6201; G06K 2009/363; G06T 5/00; G06T 5/001; G06T 5/006; G06T 5/007; G06T 7/80; G06T 7/90; H04N 1/00002; H04N 1/00005; H04N 1/00007; H04N 1/00018; H04N 1/00021; H04N 1/00029; H04N 1/00034; H04N 1/00058; H04N 1/00061; H04N 1/387;
(Continued)

(56) References Cited

U.S. PATENT DOCUMENTS 7,728,883 B2 *   6/2010   Hsu ...................... H04N 1/6055
                                                 348/223.1
8,922,674 B2 *   12/2014   Ranbro .................... G06T 7/90
                                                 348/223.1
(Continued)

FOREIGN PATENT DOCUMENTS

JP          2008-211673 A       9/2008

*Primary Examiner* — Eric Rush
(74) *Attorney, Agent, or Firm* — Maschoff Brennan (57) ABSTRACT

In a verification method for verifying a verification target camera, an original image in which optical characteristics of an original image camera different from the verification target camera are corrected to a captured image of a real scene captured by the original image camera is prepared, a verification image in which an influence of optical characteristics of the verification target camera is applied to the original image is prepared, image recognition of the verification image is performed by executing a verification target algorithm applied for image recognition of an image captured by the verification target camera, and an image recognition result of the verification image is evaluated.

6 Claims, 4 Drawing Sheets

(51) Int. Cl.
*G06K 9/62* (2022.01)
*G06T 5/00* (2006.01)
*G06K 9/36* (2006.01)
*G06T 7/80* (2017.01)
*H04N 1/00* (2006.01)
*G06K 9/00* (2022.01)

(52) U.S. Cl.
CPC ............. *G06K 9/40* (2013.01); *G06K 9/62* (2013.01); *G06K 9/6201* (2013.01); *G06T 5/001* (2013.01); *G06T 7/80* (2017.01); *H04N 1/00029* (2013.01)

(58) Field of Classification Search
CPC ............ H04N 1/3871; H04N 1/40006; H04N 13/246; H04N 13/327
USPC ........ 382/100, 103–105, 112, 115, 141, 167, 382/181, 224, 254, 255, 260, 261, 382/274–276, 312, 325; 348/125, 129, 348/130, 180, 222.1, 241, 441, 607; 702/81–85, 104, 108–112, 116, 124, 126, 702/189–191, 198
See application file for complete search history.

(56) References Cited

U.S. PATENT DOCUMENTS

| | | | | |
|---|---|---|---|---|
| 2002/0154797 | A1* | 10/2002 | Yamada | G06T 5/009 382/128 |
| 2005/0266395 | A1* | 12/2005 | Gholap | G06T 7/0012 435/4 |
| 2007/0165929 | A1* | 7/2007 | Torre-Bueno | G06T 5/003 382/128 |
| 2011/0058064 | A1 | 3/2011 | Hatano | |
| 2012/0050138 | A1 | 3/2012 | Sato et al. | |
| 2013/0016216 | A1* | 1/2013 | Nentwig | G06K 9/00805 348/148 |
| 2015/0363670 | A1* | 12/2015 | Sugishita | G06K 9/00771 382/155 |
| 2016/0042254 | A1* | 2/2016 | Miyauchi | G06K 9/00442 382/159 |
| 2017/0225621 | A1 | 8/2017 | Shiohara | |

* cited by examiner

VERIFICATION METHOD, VERIFICATION DEVICE, AND NON-TRANSITORY TANGIBLE STORAGE MEDIUM

CROSS REFERENCE TO RELATED APPLICATION

The present application claims the benefit of priority from Japanese Patent Application No. 2019-089229 filed on May 9, 2019. The entire disclosure of the above application is incorporated herein by reference.

TECHNICAL FIELD

The present disclosure relates to a verification method, a verification device, and a non-transitory tangible storage medium storing a computer program product for verifying a camera.

BACKGROUND

Conventionally, it has been known an image recognition technique for recognizing an object from an image captured by a camera.

SUMMARY

According to an aspect of the present disclosure, an original image in which optical characteristics of an original image camera different from a verification target camera are corrected to a captured image of a real scene captured by the original image camera is prepared, a verification image in which an influence of optical characteristics of the verification target camera is applied to the original image is prepared, image recognition of the verification image is performed by executing a verification target algorithm to be applied for image recognition of an image captured by the verification target camera, and an image recognition result of the verification image is evaluated.

BRIEF DESCRIPTION OF DRAWINGS

Objects, features and advantages of the present disclosure will become apparent from the following detailed description made with reference to the accompanying drawings. In the drawings.

DETAILED DESCRIPTION

In a certain image recognition technology, a traveling lane of a vehicle is recognized from an image captured by a camera mounted on the vehicle. When using this image recognition technology, it is necessary to verify an influence of optical characteristics of the camera on an accuracy of image recognition in advance. The verification method includes, for example, acquiring a captured data affected by the optical characteristics of a verification target camera by capturing a real scene with the verification target camera, and evaluating whether a recognition target can be correctly recognized from the captured data. However, in the above-described verification method, when optical characteristics of the verification target camera are changed due to a change in generation, specifications, or the like, necessity to newly capture a real scene may be generated.

According to an aspect of the present disclosure, a verification method implemented by at least one processor for verifying a verification target camera, includes preparing an original image in which optical characteristics of an original image camera different from the verification target camera are corrected to a captured image of a real scene captured by the original image camera, preparing a verification image in which an influence of optical characteristics of the verification target camera is applied to the original image, performing image recognition of the verification image by executing a verification target algorithm to be applied for image recognition of an image captured by the verification target camera, and evaluating an image recognition result of the verification image.

According to another aspect of the present disclosure, a verification device for verifying a verification target camera includes at least one processor and a memory. The memory stores instructions configured to, when executed by the at least one processor, cause the at least one processor to prepare an original image in which optical characteristics of an original image camera different from the verification target camera are corrected to a captured image of a real scene captured by the original image camera, to prepare a verification image in which an influence of optical characteristics of the verification target camera is applied to the original image, to perform image recognition of the verification image by executing a verification target algorithm to be applied for image recognition of an image captured by the verification target camera, and to evaluate an image recognition result of the verification image.

According to another aspect of the present disclosure, a non-transitory tangible storage medium stores a computer program product for verifying a verification target camera. The computer program product includes instructions configured to, when executed by at least one processor, cause the at least one processor to prepare an original image in which optical characteristics of an original image camera different from the verification target camera are corrected to a captured image of a real scene captured by the original image camera, to prepare a verification image in which an influence of optical characteristics of the verification target camera is applied to the original image, to perform image recognition of the verification image by executing a verification target algorithm to be applied for image recognition of an image captured by the verification target camera, and to evaluate an image recognition result of the verification image.

According to the above-described aspects, even if the optical characteristics of the verification target camera are changed, the verification image can be generated by applying the influence of the new optical characteristics to the original image. Thus, the influence of the optical characteristics of the verification target camera on an image recognition function can be verified by generating the verification image in which the influence of the optical characteristics of the verification target camera is applied to the original image, and performing the image recognition of the verification image. Therefore, even if the optical characteristics of the verification target camera are changed, necessity of newly capturing a real scene can be reduced.

First Embodiment

A verification method according to a first embodiment will be described with reference to FIGS. 1-4. The verification method according to the first embodiment verifies an accuracy of image recognition of a verification target camera 30 mounted on a vehicle at a development stage of the verification target camera 30 and a vehicle system including the verification target camera 30. The verification method is executed by a verification device 100 that is a computer such as a personal computer or a workstation used by a developer.

Figure 1:
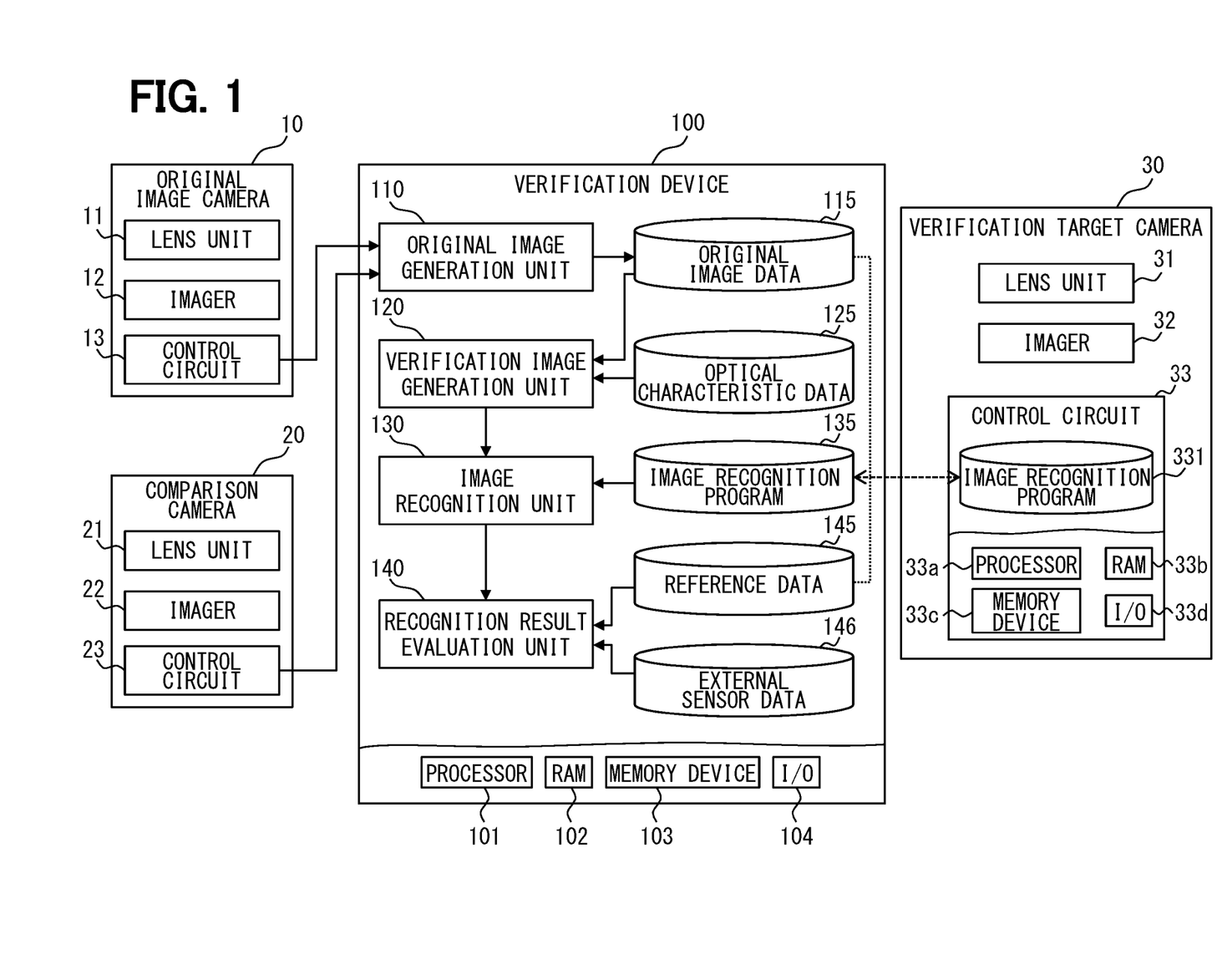
FIG. 1 is a block diagram showing a configuration for providing a verification method according to a first embodiment.

The verification target camera 30 is a camera mounted on the vehicle as an autonomous sensor that detects information capable of being used for autonomous driving or advanced driving support of the vehicle. The verification target camera 30 detects a moving object such as a person or another vehicle present around the vehicle and a stationary object such as a road installation or a lane marking, and outputs detection information to an in-vehicle network. The detection information is used for calculating a travel plan required for the autonomous driving or the advanced driving support. The detection information may be used in combination with detection information of another autonomous sensor such as a lidar, a millimeter-wave radar, or a sonar.

The verification target camera 30 sets a predetermined range in front of the vehicle as an imaging range. The verification target camera 30 is attached to a position inside a front windshield of the vehicle that does not substantially obstruct a view of an occupant sitting on a seat. The verification target camera 30 includes a lens unit 31, an imager 32, and a control circuit 33.

The lens unit 31 includes a lens set and a lens holder. The lens set includes a plurality of lenses. The lens set has a lens configuration that ensures desired lens angle of view, brightness, and resolution. The lens holder is a substantially cylindrical housing member for housing the lens set in the lens holder, and defines an optical path space for guiding an optical image in the lens holder.

The imager 32 mainly includes a color or monochrome image sensor such as a charge-coupled device (CCD) or a complementary metal oxide semiconductor (CMOS). The imager 32 is configured to ensure desired number of pixels, dynamic range, and sensitivity. The imager 32 may be a combination of, for example, an IR cut filter on a front side of the image sensor. The imager 32 is formed in a rectangular plate shape as a whole. The imager 32 is housed in the lens holder and is arranged in the optical path space. On the imager 32, a light image of a real scene passing through the lens set in the lens unit 31 is formed. The imager 32 receives the formed light image and outputs a data of the formed light image as an electric signal to the control circuit 33.

The control circuit 33 mainly includes a microcomputer having a processor 33a, a random access memory (RAM) 33b, a memory device 33c, and an input-output interface (I/O) 33d. The processor 33a is hardware for arithmetic processing combined with the RAM 33b. By accessing the RAM 33b, the processor 33a performs various processing for realizing functions of respective functional units described later to provide the verification method. The memory device 33c includes a non-volatile storage medium, and stores various programs to be executed by the processor 33a.

The control circuit 33 has an image processing function of executing an image processing program to perform an image processing on a signal output from the imager 32 to generate an image of the real scene. In addition, the control circuit 33 controls an imaging operation of the imager 32 including an exposure state at a time of capturing by the imager 32. For example, the control circuit 33 sets a range of effective pixels while avoiding a range of pixels in which a part of the vehicle is reflected. The control circuit 33 controls the exposure state at the time of the next capturing based on the pixel value of the effective pixels within the set range.

The control circuit 33 has an image recognition function of recognizing a recognition target within an imaging range shown in an image. The control circuit 33 executes a predetermined algorithm for image recognition (verification target algorithm) by executing an image recognition program stored in a storage area 331 of the memory device 33c by a processor 33a to realize the image recognition function.

The control circuit 33 recognizes, as the recognition target, an object necessary for generating the travel plan of the vehicle by the image recognition function. The recognition target is, for example, a moving object such as a person or another vehicle present around the vehicle, and a stationary object such as a road installation or a lane marking. The control circuit 33 recognizes a position, a shape, an attribute, and the like of the recognition target by the image recognition function, and outputs the recognition result to the in-vehicle network.

The recognition accuracy of the image recognition function is affected by optical characteristics of the verification target camera 30, such as lens characteristics of the lens unit 31 and characteristics of the imager 32. For example, if the light image of the real scene is formed on the imager 32 in a state distorted by the lens characteristics, the image generated by the image processing function is also distorted. As a result, when a shape or a size of an object reflected in the real scene deviates from the original one, there may be a case that the image recognition function cannot correctly recognize the recognition target. For example, unrecognition of the recognition target reflected in the image, erroneous recognition of the shape, the attribute, or the like of the recognition target, erroneous recognition of the recognition target in an area where the recognition target is not present may occur. In addition to the distortion, optical characteristics such as resolution, exposure, dynamic range, brightness, angle of view can affect the recognition accuracy of the image recognition function.

The verification device 100 verifies the recognition accuracy of the verification target camera 30 by evaluating whether the image recognition function can correctly recognize the recognition target under the influence of the optical characteristics of the verification target camera 30 described above. At the time of verification, the verification device 100 is communicably connected to an original image camera 10 and a comparison camera 20.

Similarly to the verification target camera 30, the original image camera 10 includes a lens unit 11, an imager 12, and a control circuit 13, and the comparison camera 20 includes a lens unit 21, an imager 22, and a control circuit 23.

The original image camera 10 is a camera that captures a real scene image Ri. The real scene image Ri is a captured image necessary for generating an original image Oi described later. The lens unit 11 and the imager 12 of the original image camera 10 are configured to be capable of capturing an image with less deterioration compared to the verification target camera 30, in other words, to have a configuration capable of capturing a high-quality image. That is, the original image camera 10 can generate the real scene image Ri closer to the real scene as compared with the verification target camera 30. In other words, the real scene image Ri obtained by the original image camera 10 has less missing or less deformation of information, such as shape, hue, brightness, saturation, and brightness, of the real scene than an image captured by the verification target camera 30. For example, the original image camera 10 can capture an image having less distortion than the verification target camera 30. In addition, the original image camera 10 may be configured to have a higher resolution than the verification target camera 30. Further, the original image camera 10 may be configured to have a larger dynamic range than the verification target camera 30.

The comparison camera 20 is a camera that provides a comparison image necessary for evaluating whether an image generated by the verification device 100 can be adopted as the original image Oi. The comparison camera 20 has a configuration in which a degree of deterioration of a captured image is substantially the same or larger than that of the verification target camera 30. Note that the comparison camera 20 may be the same as the verification target camera 30. Each of the original image camera 10 and the comparison camera 20 captures a real scene from the vehicle traveling on a real road in advance, and generates an image of the real scene.

The verification device 100 mainly includes a control circuit having a processor 101, a RAM 102, a memory device 103, and an input-output interface (I/O) 104. The processor 101 is hardware for arithmetic processing combined with the RAM 102. The processor 101 accesses the RAM 102 to execute various processing for realizing the functions of the respective functional units. The memory device 103 includes a non-volatile storage medium, and stores various programs to be executed by the processor 101.

The verification device 100 executes the verification program stored in the memory device 103 by the processor 101 to realize an original image generation unit 110, a verification image generation unit 120, an image recognition unit 130, and a recognition result evaluation unit 140 as functional units.

The original image generation unit 110 acquires the real scene image Ri from the original image camera 10 and performs a filter processing for substantially removing the optical characteristics of the original image camera 10 from the real scene image Ri. Accordingly, the original image generation unit 110 generates a corrected image in which the optical characteristics of the original image camera 10 have been corrected.

The filter processing performed by the original image generation unit 110 includes at least a processing of correcting distortion of the real scene image Ri with respect to the real scene. In addition, the filter processing includes a resolution restoration processing, an exposure restoration processing, a dynamic range correction processing, a brightness correction processing, and a view angle correction processing, for example. Parameters used in each processing are determined based on lens characteristics of the lens unit 11 in the original image camera 10. Further, the parameters may be determined based on characteristics of the imager 12 in addition to the lens characteristics.

The original image generation unit 110 sets the corrected image generated from the real scene image Ri by the above-described filter processing as a candidate of the original image Oi, and evaluates whether the corrected image can be used as the original image Oi. The original image generation unit 110 adopts the corrected image evaluated as usable as the original image Oi and stores the original image Oi in a storage area 115 secured in the memory device 103.

The original image generation unit 110 evaluates whether the corrected image can be used as the original image Oi, for example, using the image captured by the comparison camera 20. More specifically, the original image generation unit 110 generates an image in which the influence of the optical characteristics of the comparison camera 20 is applied to the corrected image (hereinafter, a comparison characteristic image). In addition, the original image generation unit 110 acquires an image obtained by capturing the real scene by the comparison camera 20 (hereinafter, a comparison real scene image).

Next, the original image generation unit 110 performs an image recognition processing on each of the comparison characteristic image and the comparison real scene image. At this time, the original image generation unit 110 performs image recognition by executing a program that implements processing by a comparison algorithm that is equivalent to an algorithm stored in the comparison camera 20. The original image generation unit 110 adopts the corrected image as the original image Oi when an image recognition result using the comparison characteristic image matches an image recognition result using the comparison real scene image. That is, the original image generation unit 110 sets, as the original image Oi, an image that can obtain an image recognition result equivalent to an image recognition result obtained by capturing a real scene with a different camera even if the influence of optical characteristics of the different camera is applied.

The verification image generation unit 120 generates, by an image processing, a verification image Vi in which the influence of the optical characteristics of the verification target camera 30 is applied to the original image Oi. When generating the verification image Vi, the verification image generation unit 120 uses data on the optical characteristics of the verification target camera 30 stored in advance in a storage area 125 of the memory device 103. The influence of the optical characteristics to be applied includes, for example, distortion of an image due to the lenses, deterioration of resolution, change of exposure, change of dynamic range, change of brightness, and change of angle of view. Note that the verification image generation unit 120 may apply the influence of the characteristics of the imager 32 in addition to the influence of the lens characteristics.

The image recognition unit 130 performs image recognition of the verification image Vi by executing an image recognition program stored in advance in the memory device 103. The image recognition program is an algorithm equivalent to the algorithm executed by the verification target camera 30, that is, a program that implements a processing by the verification target algorithm, and is stored in a storage area 135 of the memory device 103. By executing the image recognition program, the image recognition unit 130 executes the verification target algorithm to be applied for image recognition of the image captured by the verification target camera 30, and reproduces an image recognition processing performed by the verification target camera 30. The image recognition unit 130 provides the image recognition result to the recognition result evaluation unit 140.

The recognition result evaluation unit 140 evaluates the image recognition result of the verification image Vi. The recognition result evaluation unit 140 evaluates whether the recognition target has been recognized, and whether a non-recognition target has been erroneously recognized as a recognition target. The recognition result evaluation unit 140 performs the evaluation using reference data and external sensor data.

The reference data is data including correct information such as the position, shape, attribute, and the like of the recognition target in the original image Oi. The reference data is linked to the original image Oi. The reference data is generated, for example, when an operator determines a recognition target from the original image Oi and inputs correct information. The reference data is stored in advance in a storage area 145 secured in the memory device 103.

The external sensor data is data including a recognition result of a recognition target by an autonomous sensor other than a camera, such as a lidar or a millimeter-wave radar. The external sensor data is acquired in parallel by another autonomous sensor when the vehicle equipped with the original image camera 10 travels and captures the real scene image Ri. The external sensor data is stored in advance in a storage area 146 secured in the memory device 103.

The recognition result evaluation unit 140 evaluates the degree of matching between the correct information on the recognition target in the reference data and information on the recognition target recognized by the image recognition unit 130. More specifically, the recognition result evaluation unit 140 first generates a characterized reference data applied with the influence of the optical characteristics of the verification target camera 30, and outputs the degree of matching with the correct information included in the characterized reference data as a recognition rate of the recognition target by the verification target camera 30.

The recognition result evaluation unit 140 evaluates an erroneous recognition rate at which an image that is not recognized as a recognition target in the external sensor data is recognized as a recognition target by the image recognition unit 130. The recognition result evaluation unit 140 displays, for example, the recognition rate and the erroneous recognition rate on a display of the verification device 100 as the evaluation result. Accordingly, the verification device 100 makes it possible for the developer to determine whether the verification target camera 30 has optical characteristics that can be adopted in the vehicle system.

Figure 2:
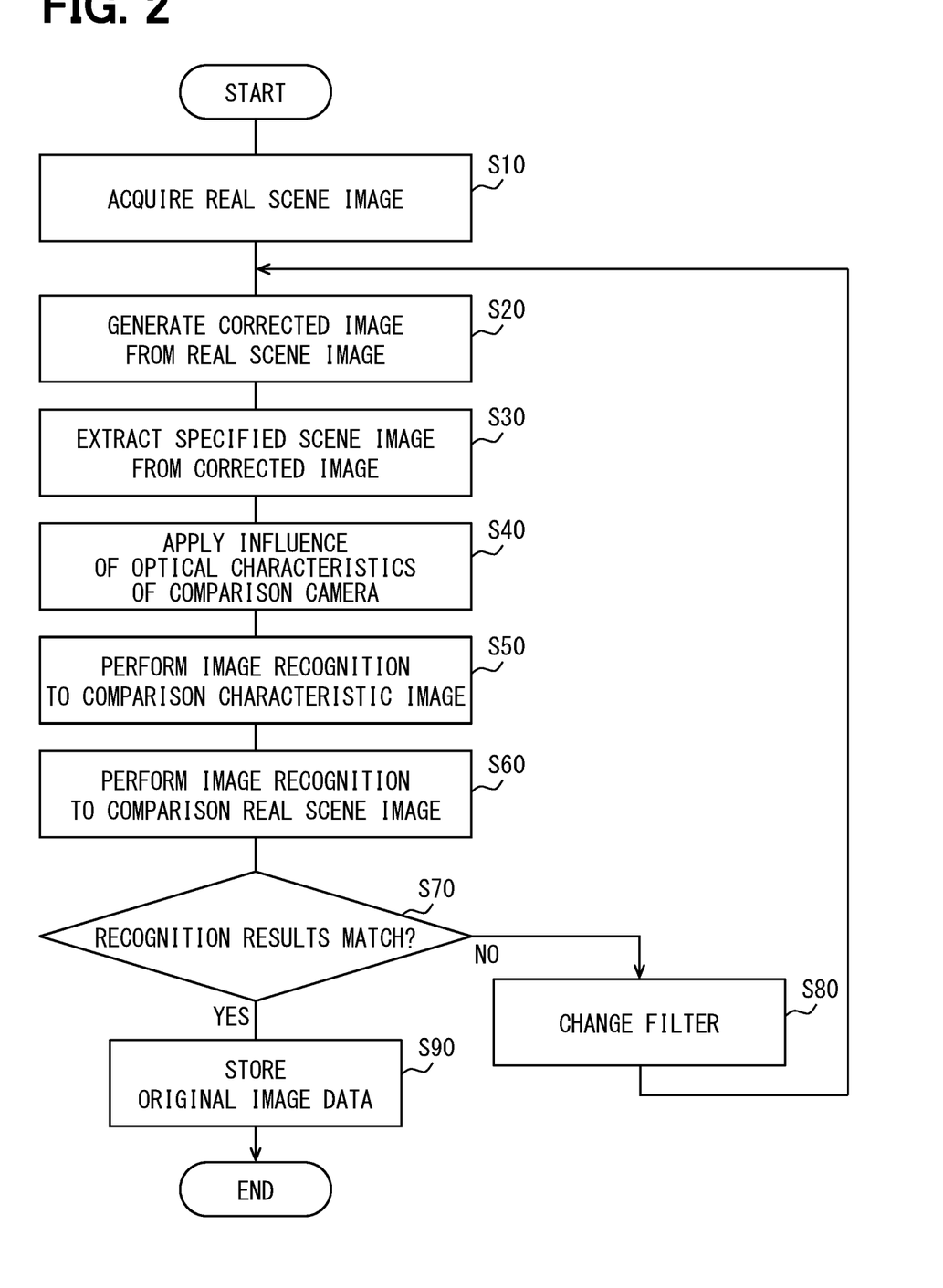
FIG. 2 is a flowchart showing an example of an original image generation processing.

Next, an example of the verification processing performed by the verification device 100 will be described based on the flowcharts shown in FIGS. 2 and 3. FIG. 2 shows a generation processing of the original image Oi in the verification processing. The processing in FIG. 2 is started, for example, when a developer performs an operation input.

First, the verification device 100 acquires the real scene image Ri in S10, and proceeds to S20. In S20, the verification device 100 generates the corrected image, in which the optical characteristics of the original image camera 10 has been corrected, from the real scene image Ri of the original image camera 10.

Next, in S30, the verification device 100 extracts a specific scene image from the corrected image. The specific scene image is an image obtained by capturing a specific scene suitable for evaluating the corrected image. The specific scene is determined based on, for example, the number and type of the recognition target appeared in the image. After extracting the specific scene image, the verification device 100 proceeds to S40.

In S40, the verification device 100 applies the influence of the optical characteristics of the comparison camera 20 to the specific scene image by the image processing to generate the comparison characteristic image and proceeds to S50. In S50, the verification device 100 performs the image recognition processing to the comparison characteristic image to extract the recognition target from the comparison characteristic image.

Next, in S60, the verification device 100 performs the image recognition processing to the comparison real scene image, which is obtained by capturing the specific scene by the comparison camera 20, to extract the recognition target. The comparison scene image is, for example, an image that has been captured in advance and transferred from the comparison camera 20 to the memory device 103 of the verification device 100. Note that, instead of S60, the verification device 100 may read an image recognition result of the comparison real scene image stored in advance.

Next, in S70, the verification device 100 determines whether the image recognition result of the comparison characteristic image matches the image recognition result of the comparison real scene image. That is, the verification device 100 determines whether the position, shape, attribute, and the like of the recognition target extracted from the comparison characteristic image match the position, shape, attribute, and the like of the recognition target extracted from the comparison real scene image. In S70, for example, the verification device 100 quantifies a matching rate between the two image recognition results, and determines that the image recognition results match with each other when the matching rate exceeds a predetermined threshold.

When determining that the image recognition results do not match, since the optical characteristics of the original image camera 10 have not been sufficiently corrected and the optical characteristics affect the image recognition result, the verification device 100 proceeds to S80. In S80, the verification device 100 changes parameters of a filter used to generate the corrected image, and the verification device 100 returns to S20. Accordingly, the verification device 100 generates a corrected image again with a different filter in S20 and repeats a series of processing.

On the other hand, when the verification device 100 determines in S70 that the image recognition results match, the verification device 100 proceeds to S90. In S90, the verification device 100 adopts the corrected image used for generating the comparison characteristic image as the original image Oi, stores the original image Oi in the memory device 103, and ends the series of processing.

Figure 3:
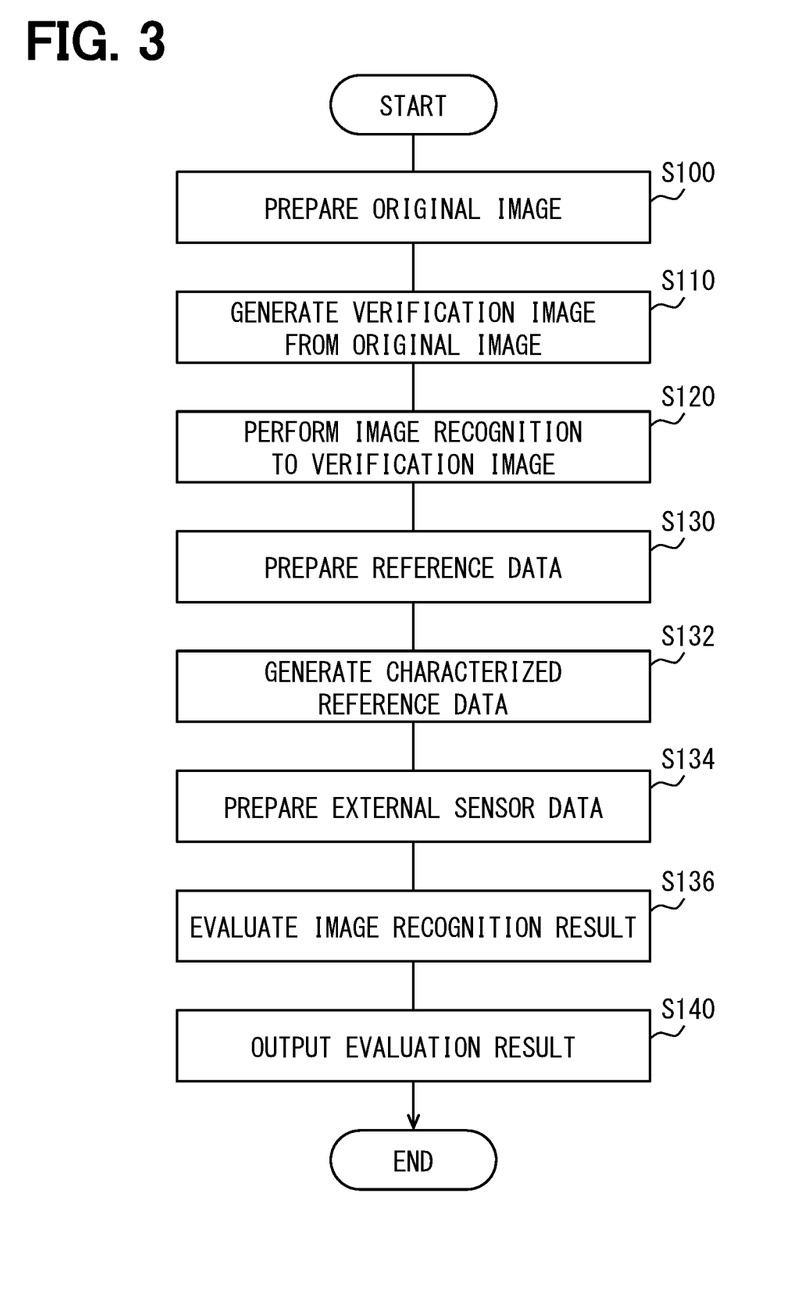
FIG. 3 is a flowchart showing an example of a verification processing of a verification target camera.
Figure 4:
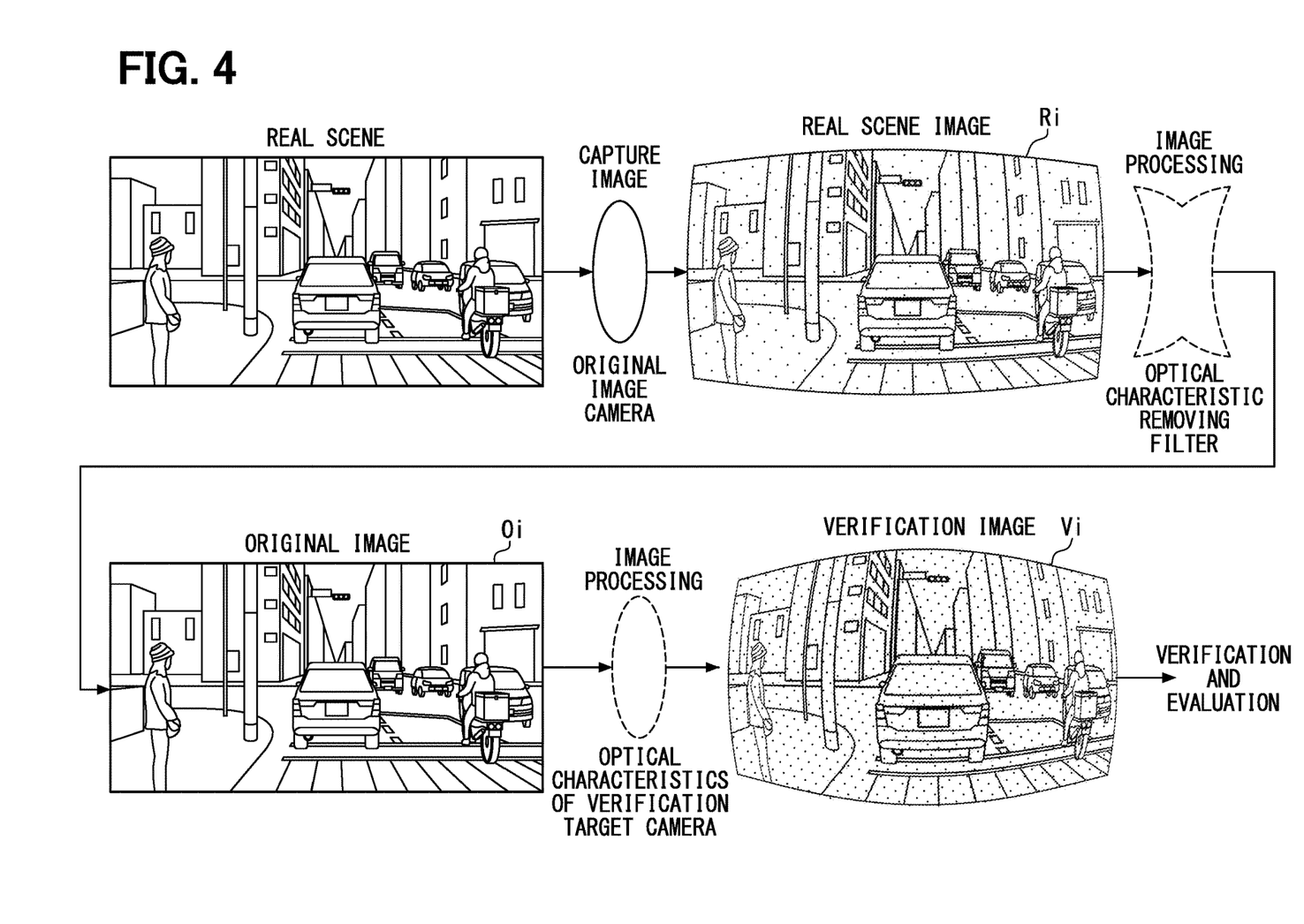
FIG. 4 is a schematic diagram showing an outline of the verification method and processed images.

FIG. 3 shows a processing executed after the generation processing of the original image Oi in the verification processing. A series of processing may be started based on an operation input by a developer, or may be automatically started following the generation processing of the original image Oi.

First, in S100, the verification device 100 prepares the original image Oi by reading the original image Oi stored in the storage area 115 into the RAM 102. Next, in S110, the verification device 100 generates the verification image Vi to which the influence of the optical characteristics of the verification target camera 30 is applied, based on the stored original image Oi and data on the optical characteristics of the verification target camera 30. Since the degree of image deterioration of the verification target camera 30 is larger than the degree of image deterioration of the original image camera 10, the verification image Vi applied with the influence of the optical characteristics of the verification target camera 30 is more deteriorated than the original image Oi (see FIG. 4). Next, in S120, the verification device 100 performs an image recognition processing, which is equivalent to the image recognition processing in the verification target camera 30, to the verification image Vi.

Next, in S130, the verification device 100 prepares the reference data by reading out the reference data from the memory device 103 and proceeds to S132. In S132, the verification device 100 generates the characterized reference data applied with the influence of the optical characteristics of the verification target camera 30 read out from the storage area 125. Specifically, the verification device 100 converts the correct information regarding the position, shape, and the like of the recognition target in the original image Oi included in the reference data into the correct information regarding the recognition target in the verification image Vi according to the distortion of the original image Oi caused by the optical characteristics. Next, in S134, the verification device 100 acquires the external sensor data by reading out from the storage area 146.

Next, in S136, the verification device 100 evaluates the image recognition result of the verification image Vi using the characterized reference data and the external sensor data. In S136, the verification device 100 evaluates the recognition rate and the erroneous recognition rate of the recognition target appeared in the verification image Vi as the image recognition result. Next, in S140, the verification device 100 outputs the evaluation result in S136, for example, to a display or the like. After performing the processing in S140, the verification device 100 ends the series of processing.

Next, the operation and effects of the verification method according to the first embodiment will be described.

In the verification method according to the first embodiment, the verification image Vi in which the influence of the optical characteristics of the verification target camera 30 is applied to the original image Oi is generated, the verification image Vi is subjected to the image recognition processing by the image recognition unit 130, and the image recognition result is evaluated. Thus, even if the optical characteristics of the verification target camera 30 are changed, the verification image Vi can be generated by applying the influence of the new optical characteristics to the original image Oi. Therefore, necessity of newly capturing a real scene with the verification target camera 30 is reduced. Accordingly, the verification method according to the first embodiment can restrict an increase in verification time and cost due to a change in optical characteristics of the verification target camera 30.

In the verification method according to the first embodiment, the influence of the optical characteristics of the verification target camera 30 is applied to the verification image Vi by the image processing. Accordingly, as compared with a case where the original image Oi is captured by the verification target camera 30, the verification image Vi is less likely to be affected by other than the optical characteristics of the verification target camera 30. Therefore, the influence of factors other than the optical characteristics of the verification target camera 30 on the evaluation of the image recognition result can be restricted.

In addition, the original image camera 10 according to the first embodiment is capable of capturing the captured image with less deterioration than the verification target camera 30. Thus, the verification method can easily generate the original image Oi in which the optical characteristics of the original image camera 10 have been corrected.

The verification device 100 according to the first embodiment prepares the reference data in which the recognition target is extracted from the original image Oi in advance, and generates data in which the optical characteristics of the verification target camera 30 are applied to the reference data. The verification device 100 evaluates the image recognition result based on the data. Accordingly, even when the optical characteristics of the verification target camera 30 are changed, the verification device 100 can evaluate the image recognition result by applying the influence of the new optical characteristics to the reference data. Therefore, even if the optical characteristics of the verification target camera 30 are changed, the necessity of regenerating new reference data is reduced.

In addition, the verification device 100 according to the first embodiment generates the corrected image as a candidate of the original image Oi from the real scene image Ri, and generates the comparison characteristic image in which the optical characteristics of the comparison camera 20 are applied to the corrected image. The verification device 100 performs image recognition of the comparison characteristic image and the comparison real scene image by the comparison camera 20. The verification device 100 determines whether the image recognition results match with each other, and adopts the corrected image as the original image Oi when determining that the image recognition results match with each other.

Accordingly, the verification device 100 can determine whether the optical characteristics of the original image camera 10 are corrected to such an extent that the optical characteristics do not affect the image recognition result by comparing the image recognition results of the comparison characteristic image and the comparison real scene image. Therefore, the verification device 100 can restrict the optical characteristics of the original image camera 10 remaining in the original image Oi from affecting the verification of the verification target camera 30.

OTHER EMBODIMENTS

The disclosure in the present specification is not limited to the illustrated embodiments. The disclosure encompasses the illustrated embodiments and modifications based on the embodiments by those skilled in the art. For example, the disclosure is not limited to the combinations of components and/or elements shown in the embodiments. The disclosure may be implemented in various combinations. The disclosure may have additional portions that may be added to the embodiments. The disclosure encompasses omission of components and/or elements of the embodiments. The disclosure encompasses the replacement or combination of components and/or elements between one embodiment and another. The disclosed technical scope is not limited to the description of the embodiments.

In the above-described embodiment, the verification target camera 30 is configured to have the image recognition function. Alternatively, the verification target camera 30 may be configured not to include the image recognition function, and to output the image data to another control device such as an in-vehicle ECU that has the image recognition function. When such a verification target camera 30 is verified, the verification device 100 may perform image recognition of the verification image Vi using an image recognition program of a control device that performs image recognition of a captured data.

In the above-described embodiment, the verification device 100 executes the image recognition processing using the image recognition program stored in advance in the memory device 103. Alternatively, the verification device 100 may be configured to output the verification image Vi to the control circuit 33 of the verification target camera 30 and acquire the image recognition result in the control circuit 33.

In the above-described embodiment, the verification device 100 generates the original image Oi from the real scene image Ri captured by the original image camera 10. Alternatively, the verification device 100 may be configured to acquire the original image Oi generated by another device. For example, the verification device 100 may acquire the original image Oi distributed from another service.

In the above-described embodiment, the verification device 100 generates the verification image Vi by applying the influence of the optical characteristics of the verification target camera 30 to the original image Oi by the image processing. Alternatively, the verification device 100 may be configured to acquire a captured data of the original image Oi from the verification target camera 30 as the verification image Vi. In this case, the verification target camera 30 may be configured to capture the original image Oi projected on a screen or the like to acquire the captured data.

Each of the processors 33a, 101 in the embodiments may be a processing unit including one or more central processing units (CPUs). In addition to the CPUs, each of the processors 33a, 101 described above may be a processor including a graphics processing unit (GPU), a data flow processor (DFP), and the like. Further, each of the processors 33a, 101 may be a processing unit including a field-programmable gate array (FPGA), an IP core specialized for a particular processing such as learning and reasoning of AI, and the like. Each arithmetic circuit of such a processor may be individually mounted on a printed circuit board, or may be mounted on an application specific integrated circuit (ASIC) or an FPGA.

Various non-transitory tangible storage medium, such as a flash memory and a hard disk, may be employed as each of the memory devices 33c, 103 that store various programs. The form of the storage medium described above may also be changed as appropriate. For example, the storage medium may be in the form of a memory card or the like, and may be inserted into a slot portion provided in the verification device 100 and electrically connected to the control circuit.

The control circuit and the method described in the present disclosure may be implemented by a special purpose computer configuring a processor programmed to perform one or more functions embodied by a computer program. Alternatively, the device and the method described in the present disclosure may be implemented by a dedicated hardware logic circuit. Alternatively, the device and the method described in the present disclosure may be implemented by one or more dedicated computers configured by a combination of a processor executing a computer program and one or more hardware logic circuits. The computer program may also be stored on a computer-readable non-transitory tangible recording medium as instructions to be executed by a computer.

What is claimed is:

1. A verification method implemented by at least one processor for verifying a verification target camera, comprising:
   preparing an original image in which optical characteristics of an original image camera different from the verification target camera are corrected in a captured image of a real scene captured by the original image camera;
   preparing a verification image in which an influence of optical characteristics of the verification target camera is applied to the original image;
   performing image recognition of the verification image by executing a verification target algorithm to be applied for image recognition of an image captured by the verification target camera;
   evaluating an image recognition result of the verification image;
   generating a corrected image as a candidate of the original image from the captured image of the real scene captured by the original image camera;
   generating a comparison characteristic image in which an influence of optical characteristics of a comparison camera different from the original image camera is applied to the corrected image;
   performing image recognition of the comparison characteristic image by executing a comparison algorithm to be applied for image recognition of an image captured by the comparison camera;
   performing image recognition of a comparison real scene image, which is obtained by capturing the real scene with the comparison camera, by executing the comparison algorithm;
   determining whether an image recognition result of the comparison characteristic image and an image recognition result of the comparison real scene image match with each other; and
   adopting the corrected image as the original image when determining that the image recognition result of the comparison characteristic image and the image recognition result of the comparison real scene image match with each other.

2. The verification method according to claim 1, wherein the preparing the verification image includes applying the influence of the optical characteristics of the verification target camera by image processing.

3. The verification method according to claim 1, wherein the preparing the original image includes acquiring the original image generated from the captured image of the real scene captured by the original camera, wherein the original camera is capable of capturing the captured image of the real scene with less deterioration compared to the verification target camera.

4. The verification method according to claim 1, further comprising:
   preparing reference data obtained by extracting a recognition target from the original image in advance; and
   generating characterized reference data by applying the influence of the optical characteristics of the verification target camera to the reference data, wherein
   the evaluating the image recognition result of the verification image includes evaluating the image recognition result of the verification image based on the characterized reference data.

5. A verification device for verifying a verification target camera, comprising at least one processor and a memory, the memory storing instructions configured to, when executed by the at least one processor, cause the at least one processor to:
   prepare an original image in which optical characteristics of an original image camera different from the verification target camera are corrected in a captured image of a real scene captured by the original image camera;
   prepare a verification image in which an influence of optical characteristics of the verification target camera is applied to the original image;
   perform image recognition of the verification image by executing a verification target algorithm to be applied for image recognition of an image captured by the verification target camera;
   evaluate an image recognition result of the verification image;

generate a corrected image as a candidate of the original image from the captured image of the real scene captured by the original image camera;

generate a comparison characteristic image in which an influence of optical characteristics of a comparison camera different from the original image camera is applied to the corrected image;

perform image recognition of the comparison characteristic image by executing a comparison algorithm to be applied for image recognition of an image captured by the comparison camera;

perform image recognition of a comparison real scene image, which is obtained by capturing the real scene with the comparison camera, by executing the comparison algorithm;

determine whether an image recognition result of the comparison characteristic image and an image recognition result of the comparison real scene image match with each other; and adopting the corrected image as the original image when determining that the image recognition result of the comparison characteristic image and the image recognition result of the comparison real scene image match with each other.

6. A non-transitory tangible storage medium storing a computer program product for verifying a verification target camera, the computer program product comprising instructions configured to, when executed by at least one processor, cause the at least one processor to:

prepare an original image in which optical characteristics of an original image camera different from the verification target camera are corrected in a captured image of a real scene captured by the original image camera;

prepare a verification image in which an influence of optical characteristics of the verification target camera is applied to the original image;

perform image recognition of the verification image by executing a verification target algorithm to be applied for image recognition of an image captured by the verification target camera;

evaluate an image recognition result of the verification image;

generate a corrected image as a candidate of the original image from the captured image of the real scene captured by the original image camera;

generate a comparison characteristic image in which an influence of optical characteristics of a comparison camera different from the original image camera is applied to the corrected image;

perform image recognition of the comparison characteristic image by executing a comparison algorithm to be applied for image recognition of an image captured by the comparison camera;

perform image recognition of a comparison real scene image, which is obtained by capturing the real scene with the comparison camera, by executing the comparison algorithm;

determine whether an image recognition result of the comparison characteristic image and an image recognition result of the comparison real scene image match with each other; and adopting the corrected image as the original image when determining that the image recognition result of the comparison characteristic image and the image recognition result of the comparison real scene image match with each other.

* * * * *